(12) United States Patent
Tomono

(10) Patent No.: US 7,397,444 B2
(45) Date of Patent: Jul. 8, 2008

(54) 2D/3D CONVERTIBLE DISPLAY

(75) Inventor: Takao Tomono, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 759 days.

(21) Appl. No.: 10/238,893

(22) Filed: Sep. 11, 2002

(65) Prior Publication Data

US 2003/0067563 A1    Apr. 10, 2003

(30) Foreign Application Priority Data

Sep. 11, 2001  (KR) ............................... 2001-55916

(51) Int. Cl.
*G09G 5/00*  (2006.01)
(52) U.S. Cl. ...................... 345/6; 345/7; 345/8; 345/9; 345/32; 345/55
(58) Field of Classification Search .................... 345/32, 345/6–9, 55, 64, 87, 102, 105, 109, 205, 345/3, 209
See application file for complete search history.

(56) References Cited

U.S. PATENT DOCUMENTS 4,870,268 A * 9/1989 Vincent et al. .............. 250/226
5,519,533 A   5/1996 Nomura et al.
6,137,456 A * 10/2000 Bhagavatula et al. ............ 345/7
6,469,683 B1 * 10/2002 Suyama et al. ................ 345/32
2003/0067539 A1 *  4/2003 Doerfel et al. ................ 348/51
2004/0001139 A1 *  1/2004 Kobayashi .................... 348/59

FOREIGN PATENT DOCUMENTS

| JP | 03-119889 | 5/1991 |
| JP | 5-191838 A | 7/1993 |
| JP | 05-191838 A1 * | 7/1993 |
| JP | 05191838 A | 7/1993 |
| JP | 06-078339 | 3/1994 |
| JP | 10-304402 A | 11/1998 |
| JP | 11-194299 A | 7/1999 |
| KR | 1999-0053446 A | 7/1999 |
| WO | WO 01/56265 A2 | 8/2001 |

* cited by examiner

*Primary Examiner*—Richard Hjerpe
*Assistant Examiner*—Leonid Shapiro
(74) *Attorney, Agent, or Firm*—Sughrue Mion, PLLC

(57) ABSTRACT

A two-dimensional (2D)/three-dimensional (3D) convertible display using a pinhole array, and more particularly, a 2D/3D convertible display, which is easily convertible between the 2D or 3D modes using an electro-optic material of which the refractive index varies according to applied power is provided. A system capable of easily selecting 2D/3D can be used in many fields, which are in need of greatly improved video information, such as medical science, engineering, simulation, and stereoscopic video TV, which will emerge in the near future.

7 Claims, 3 Drawing Sheets

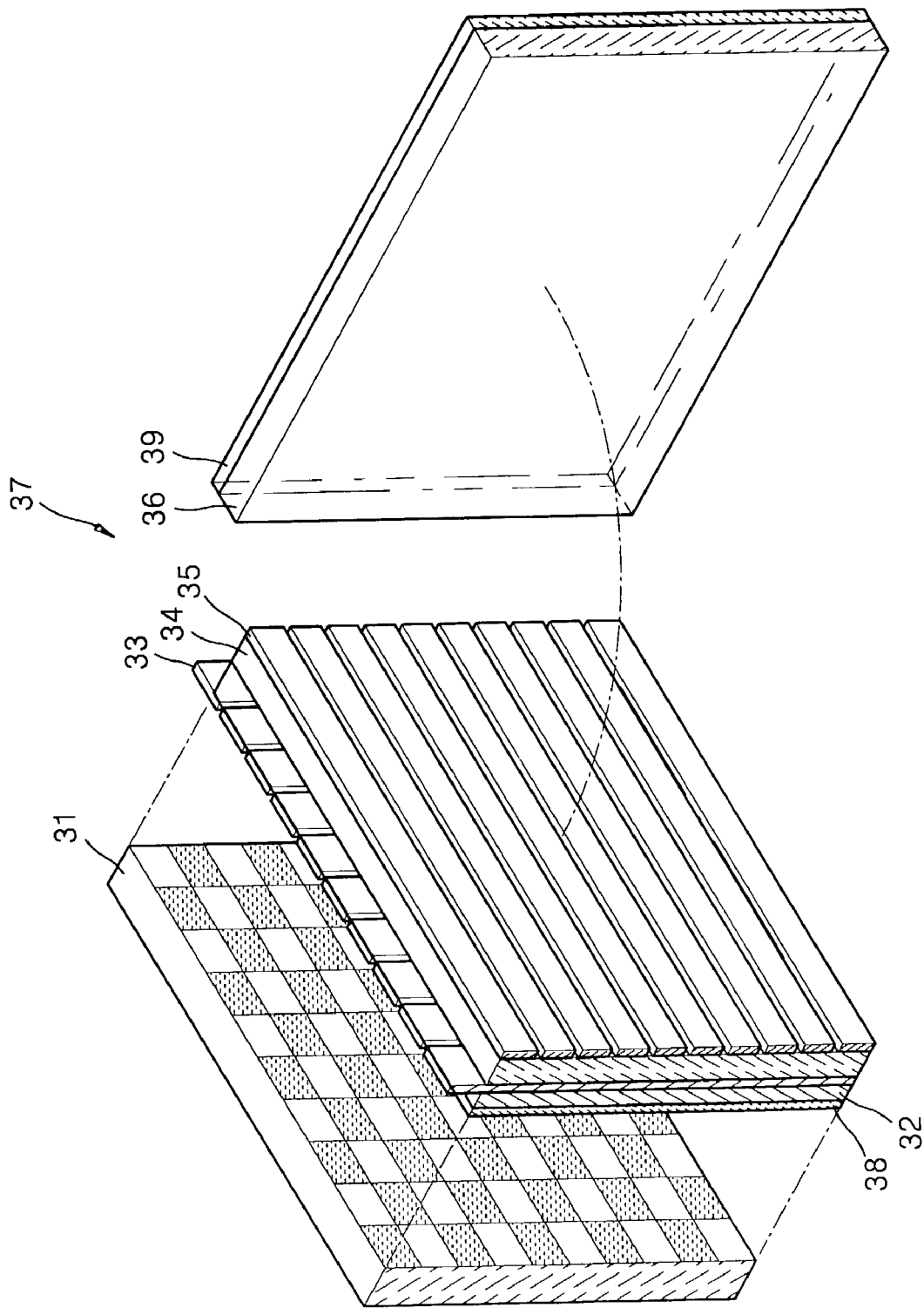

2D/3D CONVERTIBLE DISPLAY

BACKGROUND OF THE INVENTION

1. Field of the Invention

The present invention relates to a two-dimensional (2D)/three-dimensional (3D) convertible display using a pinhole array, and more particularly, to a 2D/3D convertible display, which is easily converted between 2D and 3D and vice versa, using an electro-optic material of which the refractive index varies according to applied power. The present application is based on Korean Patent Application No. 2001-55916, filed Sep. 11, 2001, which is incorporated herein by reference.

2. Description of the Related Art

A stereoscopic video display, which displays three-dimensional (3D) video broadly including stereoscopic images and 3D images, is classified on the basis of stereoscopic display method, viewpoint, observation conditions and the condition of whether or not an observer wears supplementary glasses. Binocular parallax is used so that an observer recognizes video that is provided by a display stereoscopically. That is, if video that is observed from various angles is received by both eyes, the observer's brain perceives the video in three dimensions. A display method includes stereoscopic display and volumetric display on the basis of recognition of stereoscopic views from a stereoscopic video display. In the stereoscopic display, two pieces of a 2D image having binocular parallax are divided into images that are taken from the right and left eye, respectively, to allow stereoscopic recognition. Since right and left images that are taken from the two eyes are displayed, there is a disadvantage of stereoscopic views in which they are recognized only from a single viewpoint. In the volumetric display, stereoscopic images in which an object is taken in various directions is displayed. Thus, there is an advantage in obtaining 3D images even in a case where an observing position varies, that is, in a case where the observer observes the object from various directions.

A method for displaying 3D images, which is a technique of displaying 3D images and displays binocular parallax images that are taken in various directions, includes a parallax panoramagram method, a lenticular method, an integral photography or volumetric-graph (IP) method, and a slit scan method.

Among the methods, the IP method does not require additional glasses for observation, and in the IP method, stereoscopic video is automatically obtained in a desired position, and thus the IP method is very useful to create 3D video. A display using the IP method includes a micro lens array or pinhole array and is used in many applications such as medical science, engineering, and simulation.

FIG. 1 illustrates a conventional 3D video system and method for implementing the same. An object 11 is taken by a TV camera 13 through a lens array 12, and a video signal is transmitted to a display 15 using a transmitting and receiving device and is reproduced on the display 15 through a pinhole array 16, thereby implementing 3D video. In the structure, a problem may occur in which the concave and convex images of the object to be implemented are placed in opposite directions, and thus, the system further includes a converter 14 for correcting the concave and convex images in a transmission and reception step. In this case, the pinhole array 16 is formed on the front surface of the conventional display 15 to allow received video to be stereoscopically reproduced. Here, the pinhole array 16 serves as a lens array.

A system for simulation or medical analysis, which requires the 3D video system, also requires 2D video. However, in the conventional 3D display, 2D and 3D video cannot be selectively implemented.

SUMMARY OF THE INVENTION

To solve the above problem, it is an object of the present invention to provide a two-dimensional (2D)/three-dimensional (3D) convertible display using a pinhole, which is capable of implementing 2D and 3D images in a single display without adding an additional device.

Accordingly, to achieve the object, there is provided a two-dimensional (2D)/three-dimensional (3D) convertible display in a stereoscopic video display comprising an imaging display and a pinhole array unit, which is formed on the front surface of the imaging display and includes a liquid crystal layer to which light passes that is emitted from the imaging display, wherein the liquid crystal layer selectively forms a pinhole region according to externally applied power.

It is preferable that the pinhole array unit includes a lower substrate, lower electrodes formed on the lower substrate, a liquid crystal layer formed on the lower electrodes, upper electrodes formed on the liquid crystal layer in the vertical direction with respect to the lower electrodes, an upper substrate formed on the upper electrodes, and polarization plates formed at the outsides of the lower and upper substrates, respectively.

It is also preferable that the display further includes a power supply unit for applying power to the lower and upper electrodes.

By way of example, but not limitation, the imaging display may be a cathode ray tube (CRT), a liquid crystal display (LCD), a plasma display, or an electric luminescence (EL) display.

In a preferred implementation of the invention, the liquid crystal layer is transparent when power is not applied to the lower and upper electrodes, and the liquid crystal layer is non-transparent when power is applied to the lower and upper electrodes.

BRIEF DESCRIPTION OF THE DRAWINGS

The above object and advantages of the present invention will become more apparent by describing in detail a preferred embodiment thereof with reference to the attached drawings in which:

FIG. 2 is an exploded perspective view of a 2D/3D convertible display according to the present invention;

DETAILED DESCRIPTION OF THE INVENTION

Figure 1:
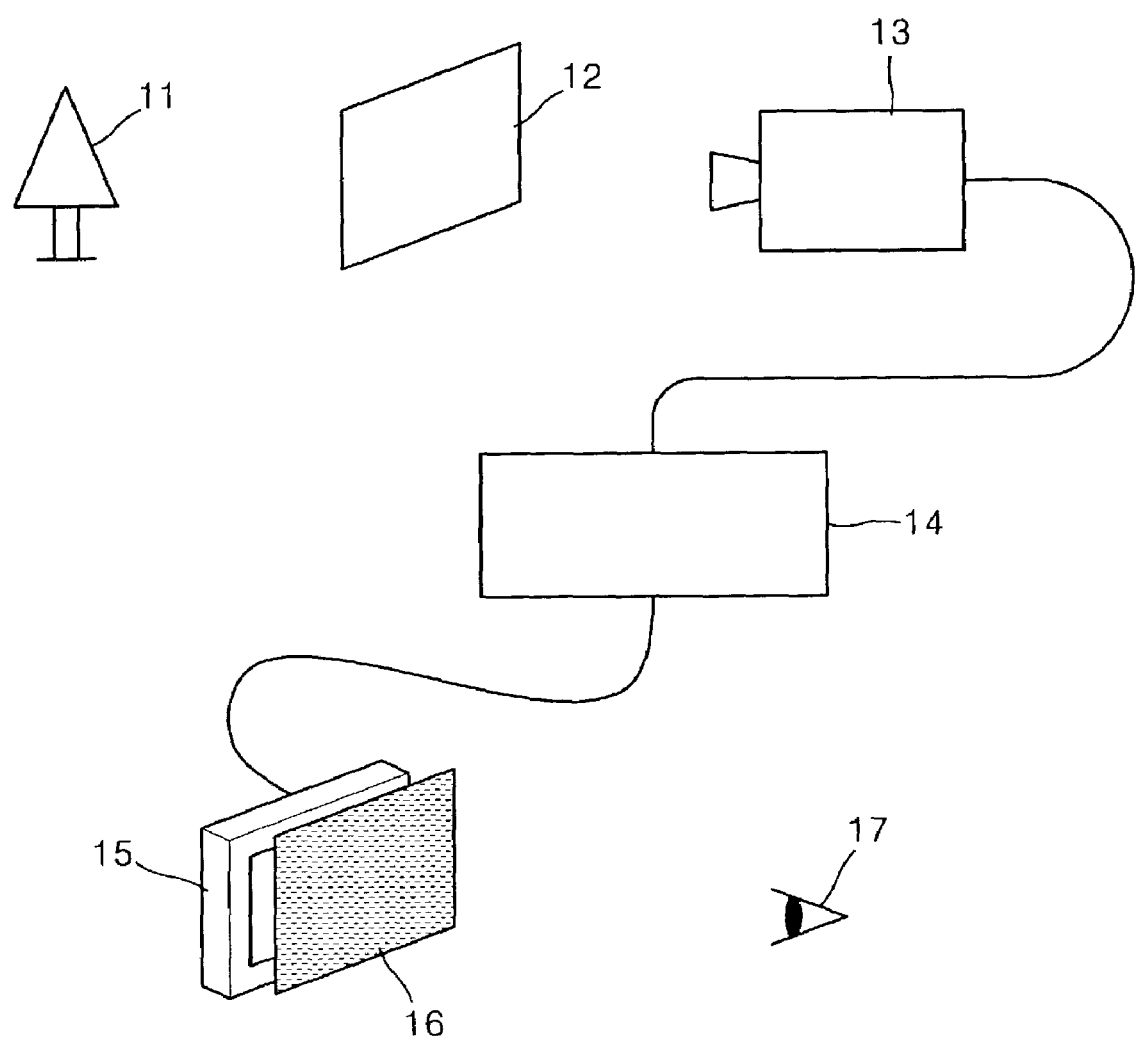
FIG. 1 illustrates the structure of a conventional 3D video display.

Hereinafter, a 2D/3D convertible display using a pinhole according to the present invention will be described in greater detail with reference to FIG. 2.

As shown in FIG. 2, the 2D/3D convertible display according to the present invention includes an imaging display 31, a pinhole array unit 37 that is positioned on the front surface of the imaging display 31, and a power supply unit (not shown) for applying power to the pinhole array unit 37.

Preferably, devices for reproducing video having high resolution and small pitch size, such as televisions, monitors, liquid crystal displays (LCDs), plasma displays, and electric luminescene (EL) displays, are generally used as the imaging display 31. The imaging display 31 in the 2D/3D convertible display according to the present invention is not different from that in prior art, in which it receives a video signal that is taken through a lens array, and outputs video.

The pinhole array unit 37 includes a lower substrate 32, an upper substrate 36, a liquid crystal layer 34 that is formed between the lower substrate 32 and the upper substrate 36, and polarization plates 38 and 39 that are formed at the outsides of the lower substrate 32 and the upper substrate 36, respectively. Lower electrodes 33 having widths corresponding to pixels of the imaging display 31 are formed between the lower substrate 32 and the liquid crystal layer 34, and upper electrodes 35 having widths corresponding to the pixels of the imaging display 31 are formed between the upper substrate 36 and the liquid crystal layer 34. Preferably, the lower electrodes 33 and the upper electrodes 35 intersect with one another such that a region in which the upper electrodes 35 and the lower electrodes 33 intersect corresponds to the pixels of the imaging display 31.

Preferably, the lower and upper substrates 32 and 36 and the lower and upper electrodes 33 and 35 are formed of a transparent material so as to pass video that is emitted from the imaging display 31. In other words, the upper and lower substrates 32 and 36 and the lower and upper electrodes 33 and 35 are formed using a material, such as InSn Oxide (ITO). An insulating layer (not shown) may be further included between the lower and upper electrodes 33 and 35 and the lower and upper substrates 32 and 36. The lower and upper electrodes 33 and 35 are connected to an external power supply unit so that power is applied to each of the electrodes.

The liquid crystal layer 34 of the pinhole array unit 37 is made of an electro-optic material, like that in U.S. Pat. No. 4,037,929, in which the orientation of liquid crystal molecules varies according to the external application of power. For example, the liquid crystal layer 34 may be formed of nematic material.

When power is not applied to the lower and upper electrodes 33 and 35, the liquid crystal molecules are oriented so that light passes through the front surface of the liquid crystal layer 34. When power is applied to the lower and upper electrodes 33 and 35, the orientation of the liquid crystal molecules varies so that light does not pass through the liquid crystal layer 34 in a portion where the lower and upper electrodes 33 and 35 intersect with one another.

Figure 3A:
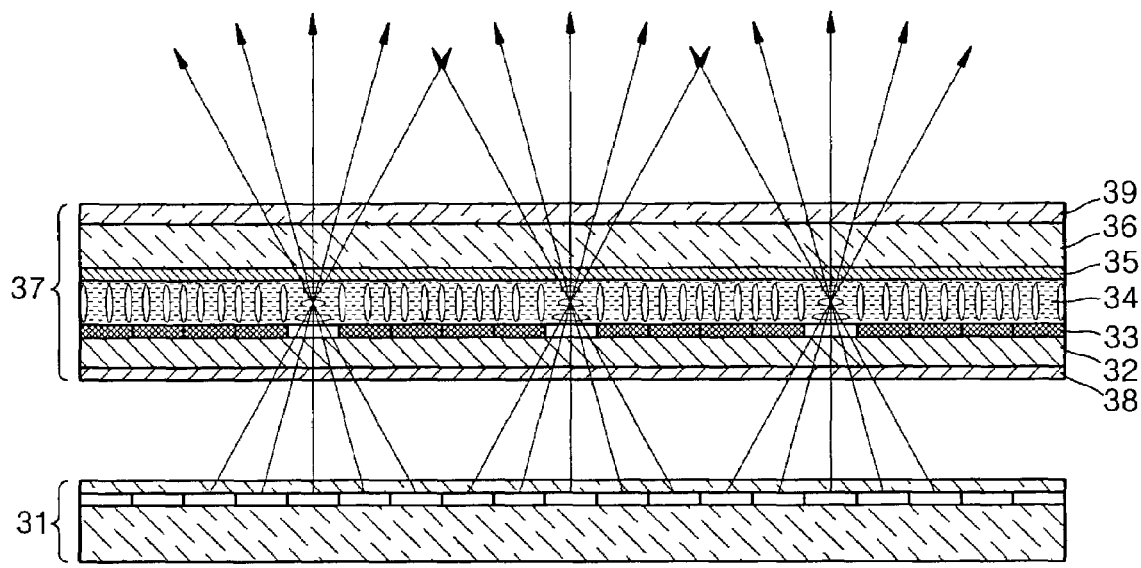
FIG. 3A is a cross-sectional view illustrating a case where 3D video is implemented by applying power to a liquid crystal layer of the 2D/3D convertible display according to the present invention.

The 2D/3D convertible display using a pinhole according to the present invention will be described below with reference to FIGS. 3A and 3B.

First, a case where 3D video is implemented will be described with reference to FIG. 3A. FIG. 3A is a cross-sectional view illustrating the 2D/3D convertible display for implementing 3D video according to the present invention. In a case where power is not applied to the lower and upper electrodes 33 and 35, the liquid crystal molecules of the liquid crystal layer 34 are oriented in the same direction as the polarization direction of the polarization plates 38 and 39 such that light passes through the liquid crystal layer 34. In this case, the pinhole array unit 37 serves as one glass plate.

Here, the power supply unit supplies power to the lower and upper electrodes 33 and 35 of the pinhole array unit 37 that are formed to be opposite to the imaging display 31. An embodiment in which the width of the lower and upper electrodes 33 and 35 is the same as the pixels of the imaging display 31 is shown. A 5×5 pixel is set to one IP unit. Light passes only through one pixel in units of 5 pixels in the case of implementing 3D video, as shown in the lower electrodes 33 of FIG. 3A.

As described above, the lower and upper electrodes 33 and 35 intersect with one another. In a case where power is selectively applied to a part of the lower and upper electrodes 33 and 35, the orientation of the liquid crystal molecules varies in a portion where the lower and upper electrodes 33 and 35 to which power is applied overlap, and simultaneously the refractive index of the liquid crystal layer 34 varies. As shown in FIG. 3A, in a case where power is applied to the lower and upper electrodes 33 and 35, excluding a portion through which light passes, light cannot pass through a region where the lower and upper electrodes 33 and 35 intersect with one another. Thus, light passes through a central portion of 5×5 pixel. In this case, a central pixel becomes a pinhole region, and thus, light that is emitted from the pixels of the imaging display 31 passes only through the pinhole region of the central region. In this way, the pinhole region is formed because the refractive index of a material of the liquid crystal layer 34 varies according to the power that is selectively applied to a part of the lower and upper electrodes 33 and 35. Thus, the pinhole serves as a lens, thereby video that is taken by a camera may be implemented as stereoscopic video.

Figure 3B:
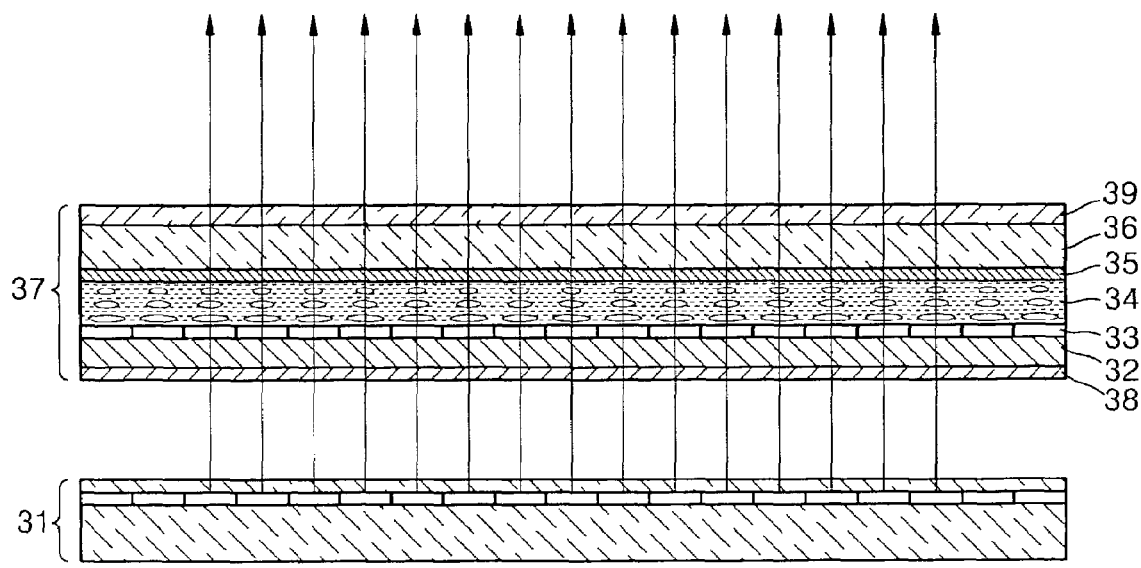
FIG. 3B is a cross-sectional view illustrating a case where 2D video is implemented in a case where power is not applied to the liquid crystal layer of the 2D/3D convertible display according to the present invention.

Referring to FIG. 3B, 2D video is implemented in a case where power is not applied to the lower and upper electrodes 33 and 35. Namely, light passes through the liquid crystal layer 34 due to the orientation of the liquid crystal layer 34, and the pinhole array unit 37 is transparent and serves as a glass plate. This means that a signal that is received from the camera is displayed on a conventional video display without passing through a 3D implementation system.

Thus, in the 2D/3D convertible display according to the present invention, the pinhole array unit 37 that is positioned on the front surface of the imaging display 31 selectively serves as a pinhole or as a glass plate. This is implemented by applying power to each of the pixels of the lower and upper electrodes 33 and 35 of the pinhole array unit 37 through the power supply unit to allow light to pass through or to be intercepted in the pinhole region of the liquid crystal layer 34. That is, in a case where light passes through all pixels in one EP unit, 2D video can be implemented. In a case where light passes only through the pinhole region of the central portion in one IP unit, 3D video can be implemented.

In the drawings and the presently described embodiment of the present invention, one IP unit is set as 5×5 pixels, but in a case where the IP unit is set as 100×100 pixels, there is a similar effect to that in a case where a smaller pinhole array is formed, and resolution can be increased more. In this manner, in the case of implementing 3D video, the resolution of the 3D video depends on the diameter of the pinhole. In the case of the 2D/3D convertible display according to the present invention, power is selectively applied to the upper and lower electrodes, thereby further extending the pinhole region and allowing resolution control.

Although an LCD exemplifies the pinhole array unit, the invention can be implemented using anything which selectively serves as a pinhole array for passing light only through a predetermined portion of the front surface of the imaging display, and serves to pass light in all regions of the front surface of the imaging display, the selection being made according to power applied from outside the pinhole array.

According to the present invention, a system capable of easily selecting 2D/3D can be used in many fields, which are in need of greatly improved video information, such as medical science, engineering, simulation, and stereoscopic video TV, which will emerge in the near future.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A two-dimensional (2D)/three-dimensional (3D) convertible display in a stereoscopic video display comprising:
   an imaging display; and
   a pinhole array unit, the pinhole unit being disposed on the front surface of the imaging display and including a liquid crystal layer to which light passes that is emitted from the imaging display, wherein the liquid crystal layer selectively forms a pinhole region and the diameter of the pinhole region is changeable according to externally applied power;
   wherein the pinhole array unit comprises:
      a lower substrate;
      lower electrodes disposed on the lower substrate;
      a liquid crystal layer disposed on the lower electrodes; and
      upper electrodes disposed on the liquid crystal layer in a direction perpendicular to the lower electrodes.

2. The display of claim 1, wherein the pinhole array unit further comprises:
   an upper substrate disposed on the upper electrodes; and
   polarization plates disposed at the outsides of the lower and upper substrates, respectively.

3. The display of claim 1, further comprising a power supply unit for applying power to the lower and upper electrodes.

4. The display of claim 1, wherein the imaging display includes one of a cathode ray tube (CRT), a liquid crystal display (LCD), a plasma display, and an electric luminescene (EL) display.

5. The display of claim 1, wherein the liquid crystal layer is transparent in a case where power is not applied to the lower and upper electrodes, and the liquid crystal layer is non-transparent in a case where power is applied to the lower and upper electrodes.

6. The display of claim 1, wherein the refractive index of a material forming the liquid crystal layer varies according to power that is selectively applied to the lower and upper electrodes, thereby forming the pinhole region.

7. The display of claim 6, wherein the liquid crystal layer is made of a nematic material.

* * * * *